US007846026B2

(12) United States Patent
Stephenson, III et al.

(10) Patent No.: US 7,846,026 B2
(45) Date of Patent: Dec. 7, 2010

(54) GAMING MACHINE DOOR WITH ADJUSTABLE CROSS MEMBER

(75) Inventors: Orlando W. Stephenson, III, Kentwood, MI (US); Kim D. Mc Comb, Grand Rapids, MI (US); Dave J. Looks, Grand Rapids, MI (US); Lee M. Terpstra, Grand Rapids, MI (US)

(73) Assignee: SPEC International, Grand Rapids, MI (US)

( * ) Notice: Subject to any disclaimer, the term of this patent is extended or adjusted under 35 U.S.C. 154(b) by 2171 days.

(21) Appl. No.: 10/810,911

(22) Filed: Mar. 26, 2004

(65) Prior Publication Data

US 2005/0130746 A1 Jun. 16, 2005

Related U.S. Application Data

(60) Provisional application No. 60/529,717, filed on Dec. 15, 2003.

(51) Int. Cl.
*A63F 13/08* (2006.01)

(52) U.S. Cl. ...................... 463/46; 312/114; 312/138.1; 312/223.1

(58) Field of Classification Search .................. 463/31, 463/46; 312/114, 138.1, 223.1; D21/325, D21/369
See application file for complete search history.

(56) References Cited

U.S. PATENT DOCUMENTS 4,084,194 A 4/1978 Hector
4,283,709 A 8/1981 Lucero et al.
4,299,388 A 11/1981 Resch et al.
4,440,457 A 4/1984 Fogelman et al.
4,448,419 A 5/1984 Telnaes
4,600,355 A 7/1986 Johnson
4,711,451 A 12/1987 Pajak et al.
4,754,658 A 7/1988 Gutknecht
4,766,422 A 8/1988 Wolters et al.
5,169,147 A 12/1992 Hamano
5,263,716 A 11/1993 Smyth
5,351,176 A 9/1994 Smith et al.
5,393,057 A 2/1995 Marnell, II
5,435,557 A * 7/1995 Coffey ........................ 463/47
5,515,959 A 5/1996 Stephenson, III et al.

(Continued)

*Primary Examiner*—David L Lewis
*Assistant Examiner*—David Duffy
(74) *Attorney, Agent, or Firm*—Price, Heneveld, Cooper, DeWitt & Litton LLP

(57) ABSTRACT

A gaming machine includes a cabinet defining an internal space and a front side. The cabinet has an opening in the front side for providing access to the internal space. A door is movably mounted to the cabinet for movement between an open position providing access to the internal space, and a closed position wherein the door substantially closes off the opening in the cabinet. The door has an enlarged opening defining generally vertical spaced apart side edges. At least one screen is mounted to the door, and extends across at least a substantial portion of the opening in the door, the screen having an outside surface. A generally horizontal cross member extends across the enlarged opening, and has opposite ends positioned adjacent the vertical side edges. The cross member is adjustably secured to the door such that the vertical position of the cross member can be adjusted to vary the size of an upper portion of the enlarged opening above the cross member, and a lower portion of the enlarged opening below the cross member, and a lower portion of the enlarged opening below the cross member.

26 Claims, 7 Drawing Sheets

U.S. PATENT DOCUMENTS 5,544,595 A 8/1996 Stephenson, III et al.
5,547,272 A * 8/1996 Paterson et al. .......... 312/223.2
5,611,535 A 3/1997 Tiberio
5,631,805 A 5/1997 Bonsall
5,636,101 A 6/1997 Bonsall et al.
D388,469 S 12/1997 Dickenson et al.
5,704,835 A 1/1998 Dietz, II
5,722,891 A 3/1998 Inoue
5,752,881 A 5/1998 Inoue
5,836,819 A 11/1998 Ugawa
D404,077 S 1/1999 Dickenson et al.
5,967,287 A 10/1999 Cole
6,019,207 A 2/2000 Cole
D424,122 S 5/2000 Dickenson et al.
6,068,101 A 5/2000 Dickenson et al.
6,092,867 A 7/2000 Miller
6,093,101 A 7/2000 Mourad
6,113,495 A 9/2000 Walker et al.
6,115,030 A 9/2000 Berstis et al.
6,135,884 A 10/2000 Hedrick et al.
6,155,928 A 12/2000 Burdick
6,164,645 A 12/2000 Weiss
6,164,652 A 12/2000 Lauretta et al.
6,165,069 A 12/2000 Sines et al.
6,165,070 A 12/2000 Nolte et al.
6,184,804 B1 2/2001 Harrison
6,186,505 B1 2/2001 Perrie et al.
6,198,515 B1 3/2001 Cole
6,200,213 B1 3/2001 Cole
6,201,703 B1 3/2001 Yamada et al.
6,219,229 B1 4/2001 Lee
6,231,445 B1 5/2001 Acres
6,251,014 B1 6/2001 Stockdale et al.
6,264,561 B1 7/2001 Saffari et al.
6,270,402 B1 8/2001 Fujioka et al.
6,270,404 B2 8/2001 Sines et al.
6,290,229 B1 9/2001 Perez
6,315,666 B1 11/2001 Mastera et al.
6,319,122 B1 11/2001 Packes, Jr. et al.
6,319,127 B1 11/2001 Walker et al.
6,350,199 B1 2/2002 Williams et al.
6,359,270 B1 3/2002 Bridson
6,368,216 B1 4/2002 Hedrick et al.
6,375,567 B1 4/2002 Acres
6,386,973 B1 5/2002 Yoseloff
6,394,900 B1 5/2002 McGlone et al.
6,394,907 B1 5/2002 Rowe
6,406,369 B1 6/2002 Baerlocher et al.
D460,496 S 7/2002 Cole
6,420,972 B1 7/2002 Loose
6,443,839 B2 9/2002 Stockdale et al.
6,464,581 B1 10/2002 Yoseloff et al.
6,468,156 B1 10/2002 Hughs-Baird et al.
6,471,208 B2 10/2002 Yoseloff et al.
6,474,645 B2 11/2002 Tarantino
6,475,087 B1 11/2002 Cole
6,503,147 B1 1/2003 Stockdale et al.
6,508,709 B1 1/2003 Karmarkar
D470,895 S 2/2003 Cole
6,514,140 B1 2/2003 Storch
6,517,073 B1 2/2003 Vancura
6,517,437 B1 2/2003 Wells et al.
6,519,594 B1 2/2003 Li
6,533,273 B2 3/2003 Cole et al.
6,565,436 B1 5/2003 Baerlocher
6,572,472 B1 6/2003 Glavich
6,575,541 B1 6/2003 Hedrick et al.
6,577,769 B1 6/2003 Kenyon et al.
6,578,735 B1 6/2003 Mothwurf
6,578,847 B1 6/2003 Hedrick et al.
6,582,310 B1 6/2003 Walker et al.
6,590,176 B2 7/2003 Cole et al.
6,595,424 B1 7/2003 Harrison
6,605,001 B1 8/2003 Tarantino
6,605,002 B2 8/2003 Baerlocher
6,609,710 B1 8/2003 Order
6,612,574 B1 9/2003 Cole et al.
6,612,575 B1 9/2003 Cole et al.
6,612,928 B1 9/2003 Bradford et al.
6,623,006 B2 9/2003 Weiss
6,656,047 B1 12/2003 Tarantino et al.
6,688,984 B2 2/2004 Cole
6,702,671 B2 3/2004 Tarantino
6,743,095 B2 6/2004 Cole et al.
6,860,814 B2 3/2005 Cole
6,870,114 B2 3/2005 Cole et al.
6,935,950 B2 8/2005 Tarantino
6,976,919 B2 12/2005 Cole
6,987,233 B2 1/2006 Cole et al.
6,997,810 B2 2/2006 Cole
7,011,581 B2 3/2006 Cole et al.
7,025,676 B2 4/2006 Cole et al.
7,374,258 B2 * 5/2008 Bowron ...................... 312/7.2
2001/0015310 A1 8/2001 Cole
2002/0019210 A1 2/2002 Cole
2002/0183106 A1 12/2002 Cole
2003/0027627 A1 2/2003 Cole
2003/0157978 A1 * 8/2003 Englman ..................... 463/16
2004/0018870 A1 1/2004 Cole
2004/0082373 A1 4/2004 Cole et al.
2004/0137978 A1 7/2004 Cole et al.
2005/0026702 A1 2/2005 Cole
2005/0143176 A1 6/2005 Cole
2005/0255924 A1 11/2005 Cole
2006/0030412 A1 2/2006 Cole
2006/0073900 A1 4/2006 Cole

* cited by examiner

GAMING MACHINE DOOR WITH ADJUSTABLE CROSS MEMBER

CROSS-REFERENCE TO RELATED APPLICATION

This application claims the benefit of U.S. Provisional Application No. 60/529,717, filed Dec. 15, 2003, the entire contents of which is hereby incorporated by reference.

BACKGROUND OF THE INVENTION

Various gaming machines and the like have been developed. Such games may include one or more video screens, rotating wheel devices, and/or displays for "progressive" games. Such games typically include a cabinet, and a front door providing access to the interior of the cabinets. The door typically includes a relatively large opening with one or more screens covering the opening and facing the user. Such screens may have various designs and the like relating to the game on the screen. Such screens may be made of a clear polymer material. Such gaming machines may include, for example, a reel device that is visible through a lower portion of the opening, and a video readout or the like that is visible above the reel devices in an upper portion of the opening in the door. Existing gaming machines may utilize a crossbar that extends across the opening to form upper and lower openings in the door, each opening providing viewing access to a video display or reel device. However, known crossbars are typically an integral portion of the door, and the doors are quite complicated, structural members due to the relatively large number of components such as game controls, speakers, electronics, and change counters, and the like that must be mounted to the door.

SUMMARY OF THE INVENTION

One aspect of the present invention is a gaming machine including a cabinet defining an internal space and a front side. The cabinet has an opening in the front side for providing access to the internal space. A door is movably mounted to the cabinet for movement between an open position providing access to the internal space, and a closed position wherein the door substantially closes off the opening in the cabinet. The door has an enlarged opening defining generally vertical spaced apart side edges. At least one sheet is mounted to the door, and extends across at least a portion of the opening in the door, wherein the sheet has an outside surface. A generally horizontal cross member extends across the enlarged opening, and has opposite ends positioned adjacent the vertical side edges of the enlarged opening. The cross member is adjustably secured to the door such that the vertical position of the cross member can be adjusted to vary the size of an upper portion of the enlarged opening above the cross member, and a lower portion of the enlarged opening below the cross member.

Another aspect of the present invention is a gaming machine including a cabinet having an enlarged opening on a front side of the cabinet, and a door pivotably mounted to the cabinet. The door has an enlarged opening therethrough in registry with the enlarged opening in the cabinet when the door is in a closed position. The gaming machine further includes a bezel secured to the door, the bezel having an enlarged opening therethrough. A cross member is fastened to the bezel, and extends across the enlarged opening in the door.

These and other features, advantages, and objects of the present invention will be further understood and appreciated by those skilled in the art by reference to the following specification, claims, and appended drawings.

BRIEF DESCRIPTION OF THE DRAWINGS

FIG. 2;

DETAILED DESCRIPTION OF PREFERRED EMBODIMENT

Figure 1:
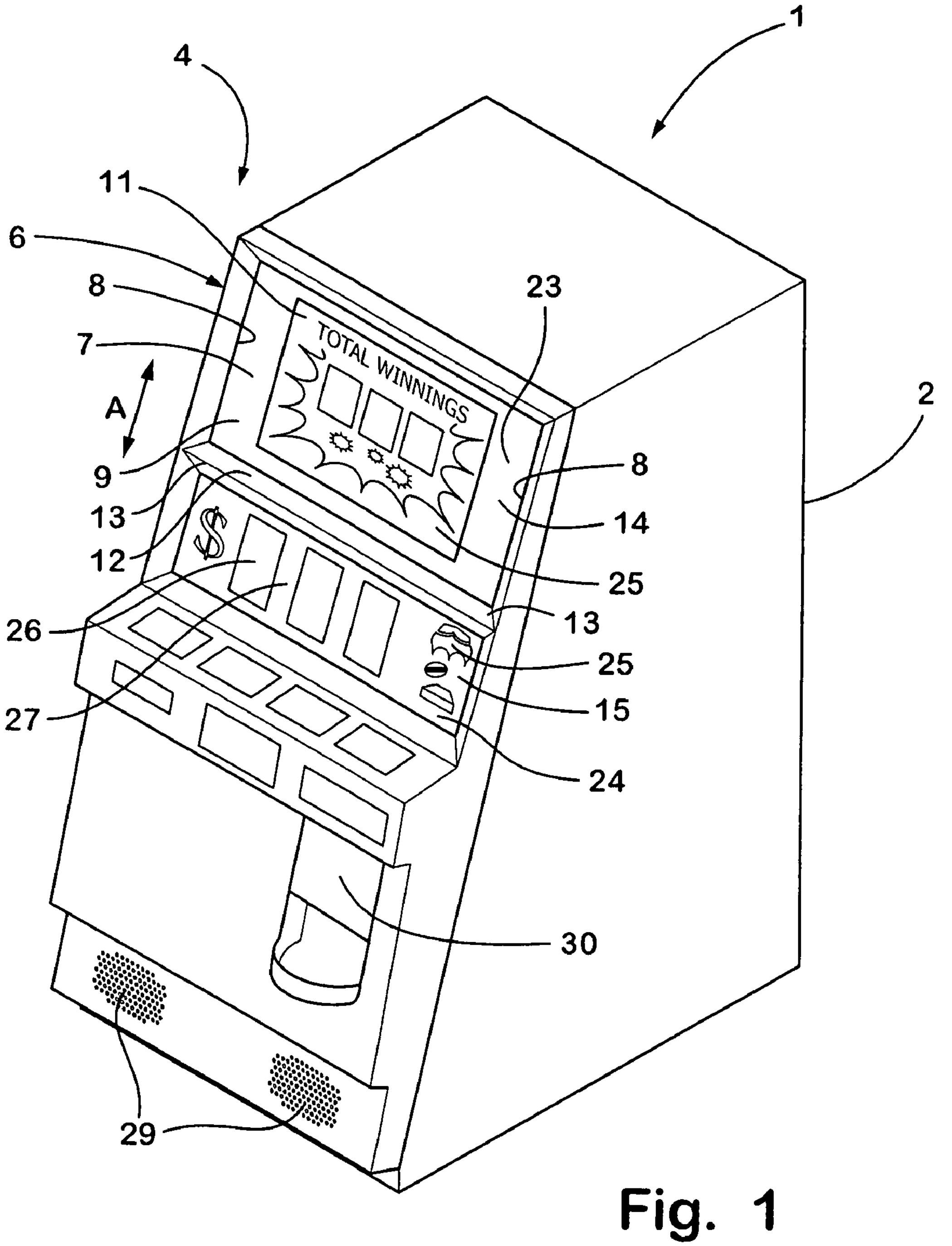
FIG. 1 is a perspective view of a gaming machine according to one aspect of the present invention, wherein a video screen is mounted to the door above the crossbar, and a reel is mounted below the crossbar.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
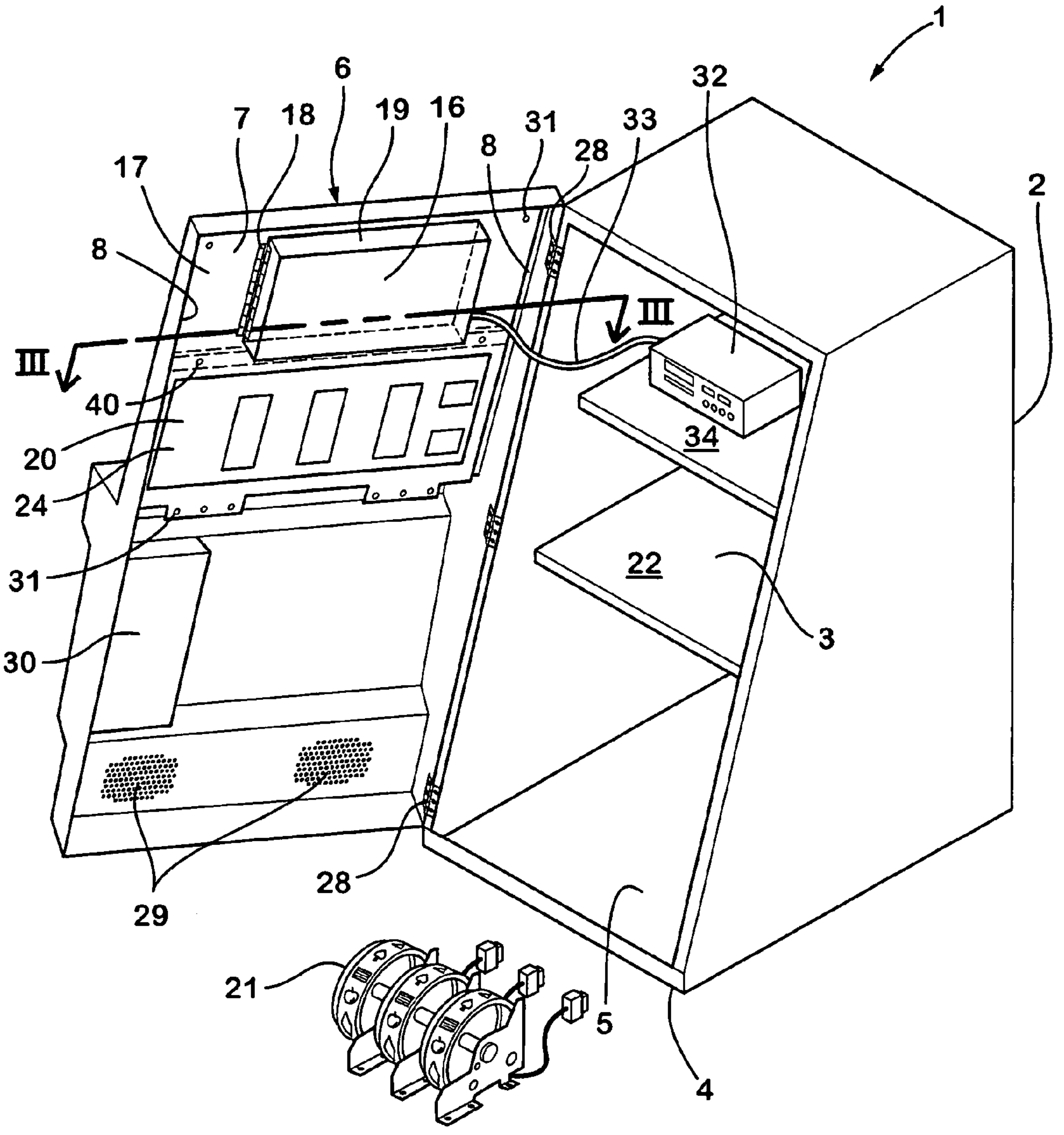
FIG. 2 is a partially fragmentary perspective view of the gaming machine of FIG. 1 with the door in the opened position.

With reference to FIGS. 1 and 2, a gaming machine 1 according to one aspect of the present invention includes a cabinet 2 defining an internal space 3, and front side 4. The cabinet has an opening 5 in the front side 4 for providing access to the internal space 3. A door 6 is movably mounted to the cabinet 2 for movement between an opened position (FIG. 2) providing access to the internal space 3, and a closed position (FIG. 1) wherein the door 6 substantially closes off the opening 5 in the cabinet 2. The door has an enlarged opening 7 defining generally vertical spaced apart side edges 8. At least one sheet 9 is mounted to the door 6, and extends across at least a substantial portion of the opening 7 in the door 6. The sheet has an outside surface 10, and at least a portion 11 of the sheet is substantially transparent such that a person using the game can see through at least a portion of the sheet. A generally horizontal cross member 12 extends across the enlarged opening 7, and has opposite ends 13 positioned adjacent the vertical side edges 8. The cross member 12 is adjustably secured to the door 6, such that the vertical position of the cross member 12 can be adjusted in the direction of the arrow "A" (FIG. 1) to vary the size of an upper opening 14 formed above the cross member 12, and to adjust the size of a lower opening 15 formed below the cross member 12.

The gaming machine 1 illustrated in FIGS. 1 and 2 includes a flat screen video display 16 that is mounted to a bezel 17 via brackets 18. The bezel 17 includes an upper opening 19 having a shape corresponding to the flat screen video display 16, and a lower opening 20 that permits a user to view reel devices 21 that may be installed to a shelf 22 in cabinet 2 utilizing known brackets or the like. The sheet 9 may be a two-piece sheet having an upper sheet 23 and a lower sheet 24. The upper and/or lower sheets may include a series of ornamental designs or the like 25. In the illustrated example, the lower sheet 24 includes a plurality of see-through portions 26 that are substantially free from designs and the like to permit unobstructed viewing of the reel device 21, and also includes an area 27 that is coated to substantially prevent or restrict a user's ability to observe the other internal components of the gaming machine 1. The door 6 is a relatively large, structural member that is mounted to the cabinet 2 utilizing a plurality of hinges 28. The door 6 is made of a relatively strong material such as steel to support speakers 29, coin/money collector 30, and other electronic components such as the flat screen video display 16. A plurality of threaded fasteners 31 or the like secure the bezel 17 to the door. Various electrical components 32 are positioned within the cabinet 2. In the illustrated example, the flat screen video display 16 is connected to the components 32 providing for operation of the game via an electrical line 33, and the components 32 are positioned on an upper shelf 34. The reel device 21 may be positioned on the shelf 22, below the upper shelf 34, such that the reel device 21 is visible through the see-through portions 26 of lower sheet 24. The electrical components, reel device, and flat screen video displays are conventional components that are known to those skilled in the art, such that these components will not be described in detail herein.

Figure 3:
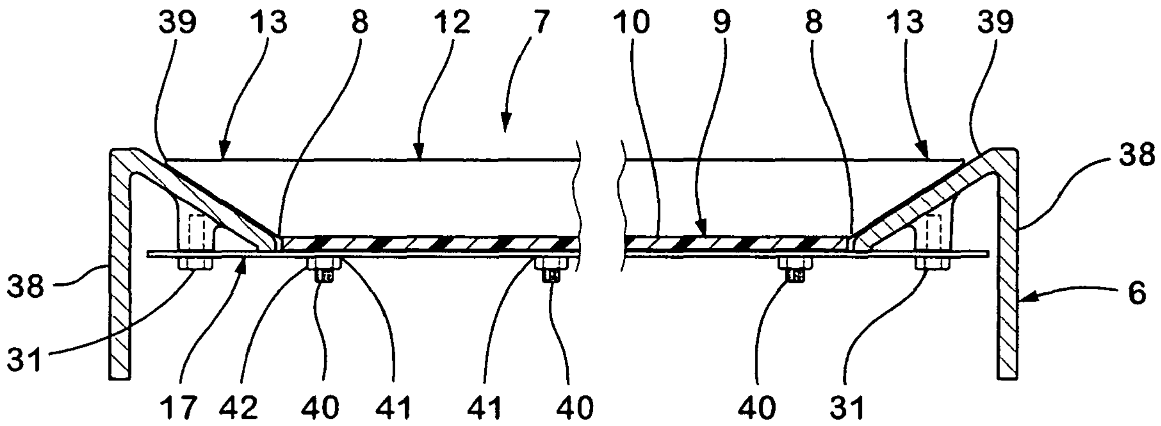
FIG. 3 is a cross-sectional view of the door taken along the line III-III.

With further reference to FIG. 3, door 6 includes side flanges 38, and inwardly sloping beveled surfaces 39 that extend to inner edges forming the vertical side edges 8 of the enlarged opening 7 in door 6. As discussed above, a plurality of threaded fasteners 31 or the like secure the bezel 17 to the door 6. The cross member 12 may include a plurality of threaded studs 40 or the like that extend through openings 41 in bezel 17. When installed, threaded nuts 42 are received on the studs 40, and draw the crossbar 12 securely against the beveled surface 39 of door 6, and against or adjacent the outer surface 10 of sheet 9, or adjacent upper and lower sheets 23 and 24, respectively. Because the vertical position of the cross member 12 can be easily changed by varying the location of the openings 41 in bezel 17, the gaming machine 1 can be readily reconfigured to accommodate various sizes of flat screen video displays 16, reel devices 21, and the like. Also, as discussed in more detail below, upper and lower flat display screens can be utilized, or a relatively small, "progressive" upper readout can be positioned above the crossbar 12, and a reel device 21 or larger flat screen video display can be positioned below the crossbar 12. Because the bezel 17 is a relatively simple, flat member, the size of the upper and lower openings utilized to provide for the video displays and/or reel devices can be readily varied, without substantially modifying the overall structure of the door 6.

Figure 4:
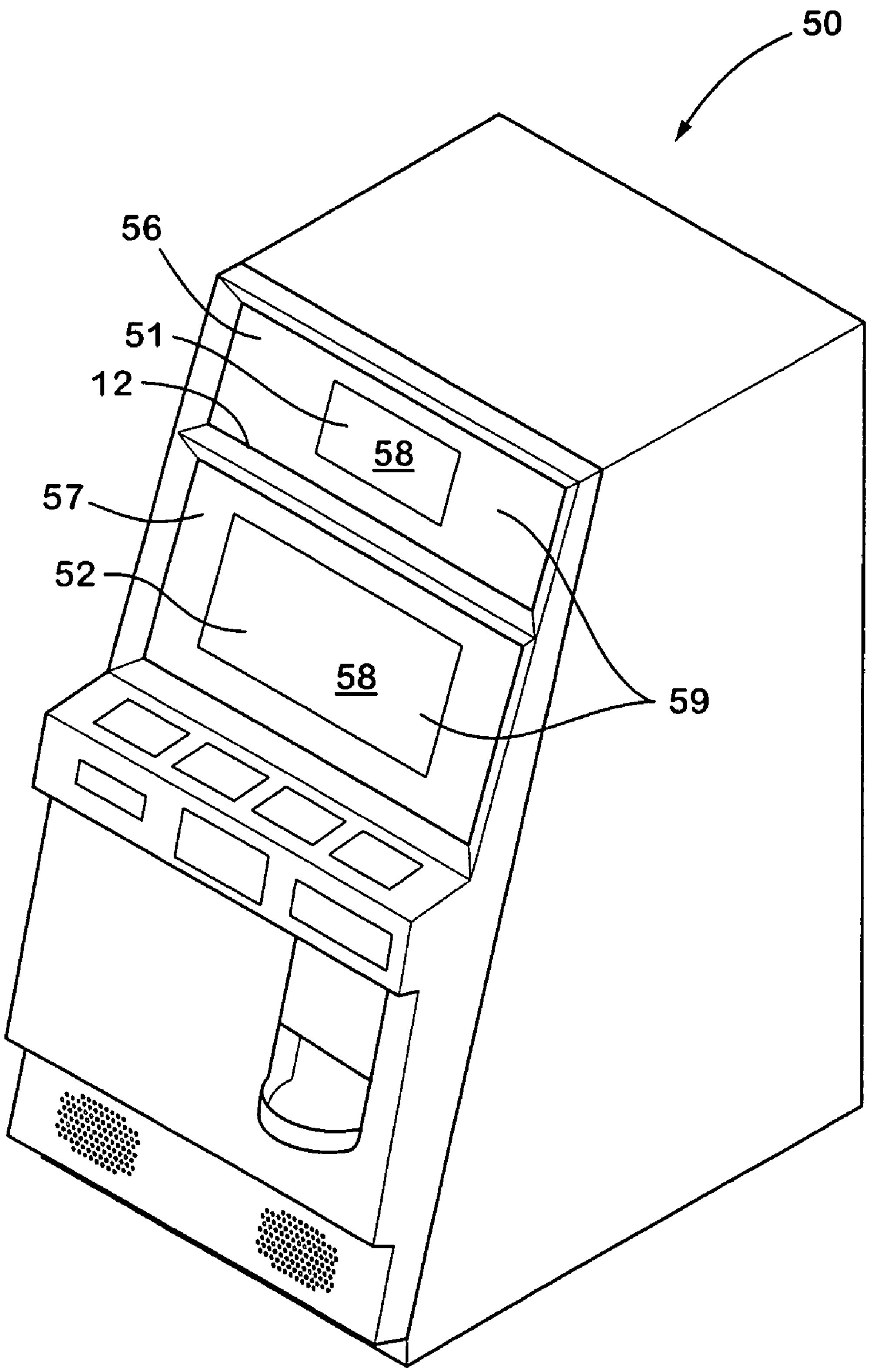
FIG. 4 is a perspective view of a video gaming machine according to another aspect of the present invention, wherein the cross member is adjusted upwardly, and the gaming machine includes a small video screen above the crossbar, and a larger video screen below the crossbar.
Figure 5:
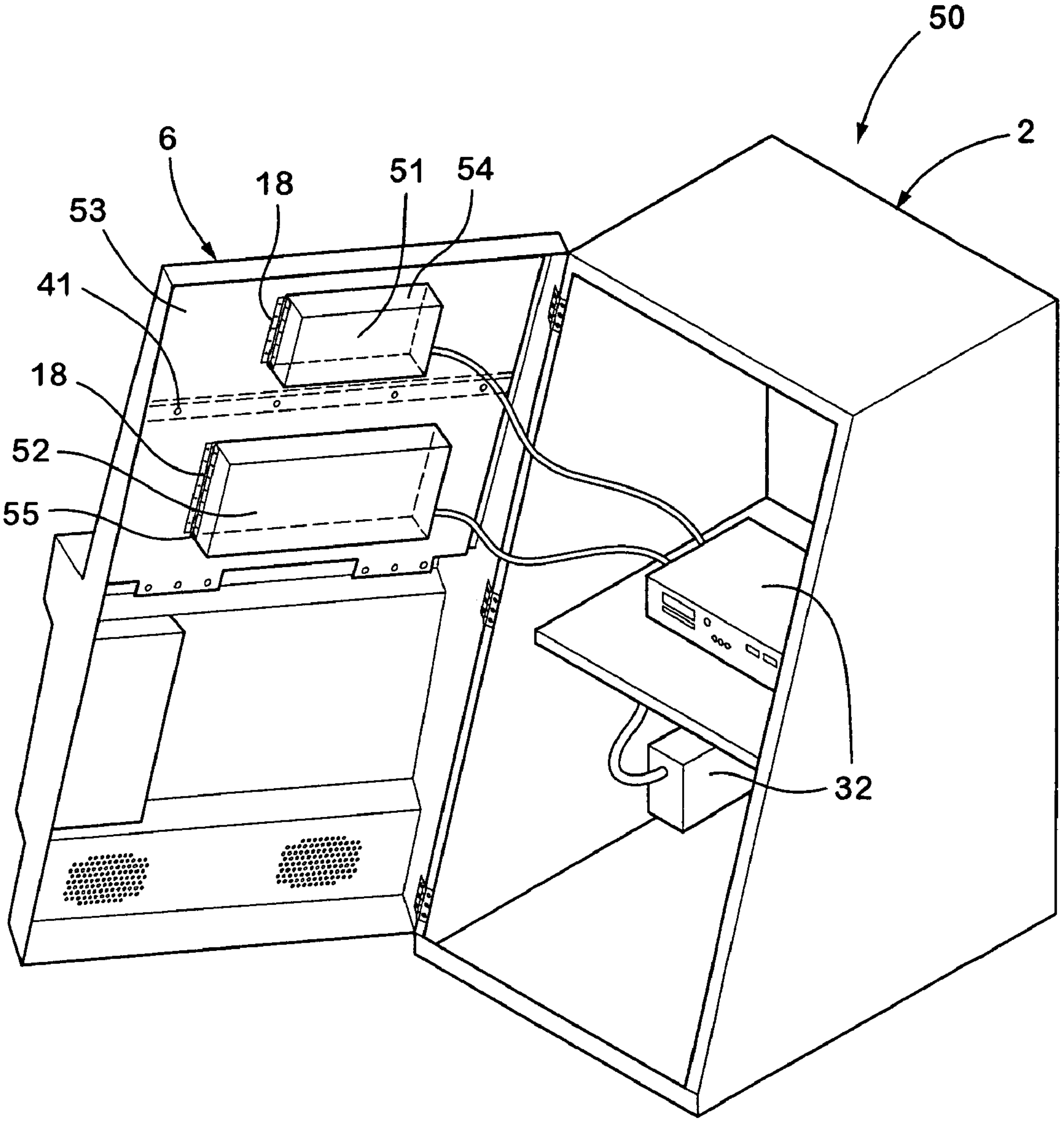
FIG. 5 is a perspective view of the gaming machine of FIG. 4 with the door in the opened position.

With further reference to FIG. 4, a gaming machine 50 according to another aspect of the present invention utilizes the same cabinet 2 and door 6. However, the gaming machine 50 includes a smaller upper electronic video display screen 51 and a larger, lower video display screen 52, each of which are mounted to a bezel 53 utilizing brackets 18. Openings 41 of bezel 53 are positioned somewhat higher than in the arrangement illustrated in FIGS. 1 and 2, such that the crossbar 12 is positioned higher to accommodate the lower video display 52. An upper opening 54 in bezel 53 is sized to provide for viewing of the upper video display screen 51, and the lower opening 55 in bezel 53 is provided to view the lower video display 52. An upper sheet 56 and lower sheet 57 may each include see-through portions 58, and portions 59 having designs or the like. The electronics 32 provide for the various game functions in a known manner.

Figure 6:
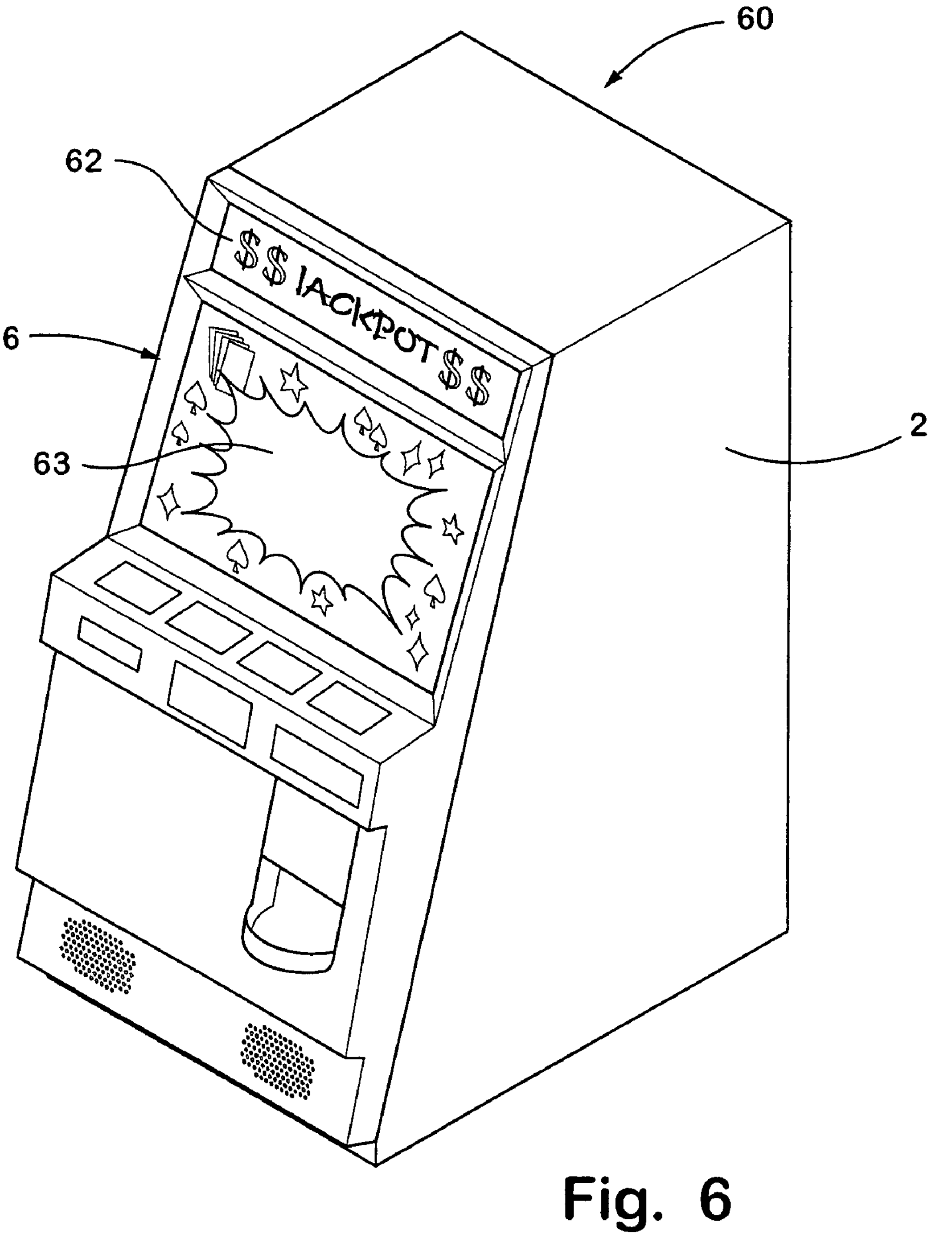
FIGS. 6-7 are perspective views of another aspect of the gaming machine of the present invention, wherein a progressive readout is located above the crossbar, and a video screen is located below the crossbar.
Figure 7:
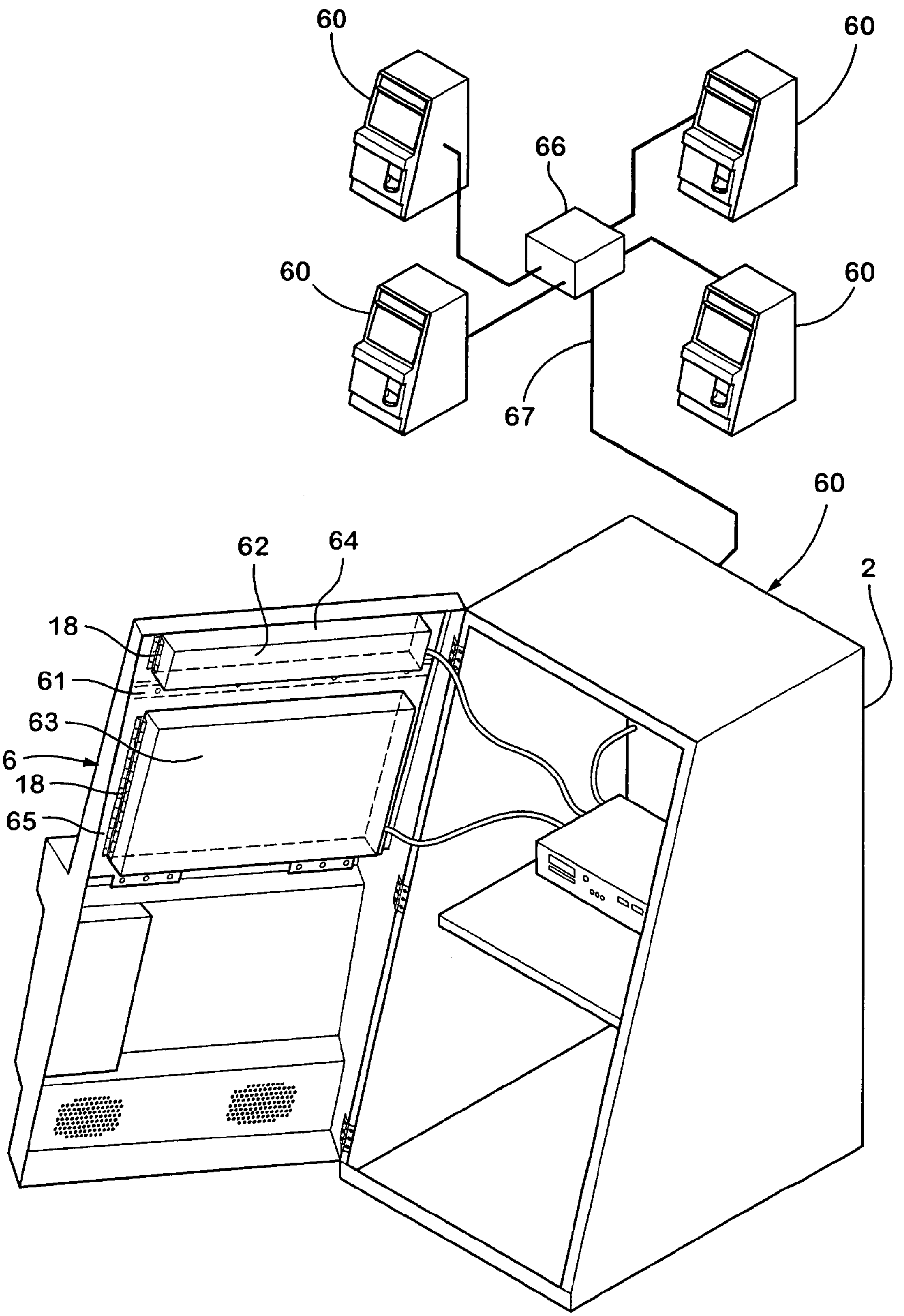

With reference to FIGS. 6 and 7 a gaming machine 60 according to another aspect of the present invention may include a cabinet 2 and door 6 having the same configuration as described above. A bezel 61 is mounted to the door 6 in substantially the same manner as described in connection with the gaming machines of FIGS. 1-5. The gaming machine 60 includes a "progressive" display 62 mounted to the bezel 61 via brackets 18, and a relatively large video display 63 that is also mounted to the bezel 61 via brackets 18. The bezel 61 includes an upper opening 64 configured to permit viewing of the progressive display 62, and a lower opening 65 permitting viewing of the lower video display 63 through the door 6. A plurality of gaming machines 60 may be interconnected via a network 67 and controller 66 to thereby provide for progressive poker or other such game.

The adjustable crossbar of the gaming machine of the present invention permits the gaming machine to be readily configured to provide for a large number of different sizes and combinations of display screens and/or reel devices or the like. The ability to provide a standard cabinet and door capable of use with a wide variety of video displays, reel devices, and combinations thereof greatly simplifies the original fabrication process. Furthermore, the adjustable crossbar also permits the gaming machine to be reconfigured/retrofitted in the event the requirements concerning the size and/or types of video displays and/or reel devices changes.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A gaming machine, comprising:

a cabinet defining an internal space and a front side, the cabinet having an opening in the front side for providing access to the internal space;

a door movably mounted to the cabinet for movement between an open position providing access to the internal space, and a closed position wherein the door substantially closes off the opening in the cabinet, the door having an enlarged opening defining generally vertical spaced apart side edges;

at least one sheet mounted to the door and extending across at least a substantial portion of the opening in the door, the sheet having an outside surface, at least a portion of the sheet being see-through; and a generally horizontal cross member extending across the enlarged opening and having opposite ends positioned adjacent the vertical side edges when in any one of a plurality of vertically-adjusted positions, the cross member including fasteners removably securing the cross member to the door in a selected one of the vertically-adjusted positions, such that the vertical position of the cross member can be adjusted during installation to vary the size of an upper portion of the enlarged opening above the cross member, and a lower portion of the enlarged opening below the cross member, the cross member being visible from a front of the cabinet when the door is in the closed position.

2. The gaming machine of claim 1, wherein:

the cross member is disposed along the outside surface of the sheet.

3. The gaming machine of claim 2, wherein:

at least a first portion of the sheet is substantially transparent.

4. The gaming machine of claim 3, wherein:

at least a second portion of the sheet has a coating reducing the transmissibility of light through the sheet.

5. The gaming machine of claim 4, wherein:

a flat screen video display is mounted to the door above the cross member; and a reel device is mounted in the cabinet below the cross member.

6. The gaming machine of claim 4, including:

a first flat screen video display mounted to the door above the cross member; and a second flat screen video display mounted to the door below the cross member.

7. The gaming machine of claim 4, including:

a first display configured to display progressive game information mounted to the door above the cross member; and a second flat screen video display mounted to the door below the cross member.

8. The gaming machine of claim 1, wherein:

the door defines an inner side facing the internal space; and including:

a mount having at least one enlarged opening therethrough, and including mounting structure securing the mount to the inner side of the door; and wherein the cross member is secured to the mount.

9. The gaming machine of claim 8, wherein:

the door includes beveled outer surfaces adjacent the vertical side edges, the beveled outer surfaces extending inwardly towards the vertical side edges; and the cross member has beveled opposite end portions that fit closely against but that are not attached to the beveled outer surfaces of the door.

10. The gaming machine of claim 1, including a mount removably secured to an inside of the door, the cross member being secured to the mount.

11. The gaming machine of claim 10, wherein the mount comprises a flat sheet.

12. The gaming machine of claim 10, wherein the fasteners include first fasteners attaching the mount to the door, and second fasteners attaching the cross member to the mount, the first and second fasteners extending into the internal space of the machine.

13. The gaming machine of claim 1, wherein the cross member includes an outer surface forming a visible exterior part of the cabinet when the door is in the closed position.

14. A gaming machine, comprising:

a cabinet having an enlarged opening on a front side of the cabinet;

a door pivotably mounted to the cabinet, the door having an enlarged opening therethrough in registry with the enlarged opening in the cabinet when the door is in a closed position;

a mount secured to the door and having an enlarged opening therethrough; and a cross member fastened to the mount and extending across the enlarged opening in the door, the cross member adjustably engaging the door to selectively divide the opening but being secured by the mount in a selected vertical position, wherein the cross member includes an outer surface forming a visible exterior part of the cabinet when the door is in the closed position.

15. The gaming machine of claim 14, including:

a screen secured to the door and extending across at least a substantial portion of the enlarged opening in the door.

16. The gaming machine of claim 15, wherein:

the screen defines an outside surface; and the cross member is disposed adjacent the outside surface of the screen.

17. The gaming machine of claim 16, wherein:

at least a first portion of the screen is substantially transparent.

18. The gaming machine of claim 17, wherein:

at least a second portion of the screen has a coating reducing the transmissibility of light through the screen.

19. The gaming machine of claim 14, wherein:

a flat screen video display is mounted to the door above the cross member; and a reel device is mounted in the cabinet below the cross member.

20. The gaming machine of claim 14, including:

a first flat screen video display mounted to the door above the cross member; and a second flat screen video display mounted to the door below the cross member.

21. The gaming machine of claim 14, including:

a first display configured to display progressive game information mounted to the door above the cross member; and a second flat screen video display mounted to the door below the cross member.

22. The gaming machine of claim 14, wherein: a video display screen is mounted to the mount.

23. The gaming machine of claim 14, including first fasteners attaching the mount to the door, and second fasteners attaching the cross member to the mount.

24. The gaming machine of claim 14, wherein the mount comprises a flat sheet.

25. The gaming machine of claim 14, wherein the cross member includes ends abutting the door but that are not attached directly to the door, and further the cross member includes fasteners extending through the mount for attaching the cross member to the mount.

26. A gaming machine, comprising:

a cabinet defining an internal space and a front side, the cabinet having an opening in the front side for providing access to the internal space;

a door movably mounted to the cabinet for movement between an open position providing access to the internal space, and a closed position wherein the door substantially closes off the opening in the cabinet, the door having an enlarged opening defining vertical side edges;

at least one sheet mounted to the door and extending across at least a substantial portion of the opening in the door, the sheet having an outside surface, at least a portion of the sheet being see-through; and a generally horizontal cross member extending across the enlarged opening and having opposite ends positioned adjacent the vertical side edges when in any one of a plurality of vertically-adjusted positions, the door including attachment structure in the internal space for attaching the cross member in any one of the vertically-adjusted positions, the cross member being a separate component but clamped against an outside of the door and secured to the door with the attachment structure in a selected one of the positions, such that the vertical position of the cross member can be adjusted during installation to vary the size of upper and lower portions of the enlarged opening above and below the cross member, wherein the cross member includes an outer surface forming a visible exterior part of the cabinet when the door is in the closed position.

* * * * *